US008205050B2

(12) United States Patent
De Baer et al.

(10) Patent No.: US 8,205,050 B2
(45) Date of Patent: Jun. 19, 2012

(54) DATA BACKUP FOR VIRTUAL MACHINES

(75) Inventors: Joachim F. M. De Baer, Sint-Gillis-Waas (BE); Robert A. Wipfel, Draper, UT (US)

(73) Assignee: Novell, Inc., Provo, UT (US)

( * ) Notice: Subject to any disclaimer, the term of this patent is extended or adjusted under 35 U.S.C. 154(b) by 441 days.

(21) Appl. No.: 12/386,157

(22) Filed: Apr. 14, 2009

(65) Prior Publication Data

US 2010/0262794 A1 Oct. 14, 2010

(51) Int. Cl.
G06F 12/16 (2006.01)
G06F 9/455 (2006.01)

(52) U.S. Cl. ............... 711/162; 718/1; 711/E12.103

(58) Field of Classification Search ............... 711/162
See application file for complete search history.

(56) References Cited

U.S. PATENT DOCUMENTS

| 7,093,086 | B1 | 8/2006 | van Rietschote |
| 7,287,083 | B1 | 10/2007 | Nay et al. |
| 2004/0044643 | A1 | 3/2004 | deVries et al. |
| 2005/0108593 | A1 | 5/2005 | Purushothaman et al. |
| 2005/0120160 | A1 | 6/2005 | Plouffe et al. |
| 2005/0198464 | A1 | 9/2005 | Sokolov |
| 2005/0246505 | A1 | 11/2005 | McKenney et al. |
| 2007/0244938 | A1 | 10/2007 | Michael et al. |
| 2007/0255775 | A1 | 11/2007 | Manolov et al. |
| 2007/0271428 | A1 | 11/2007 | Atluri |
| 2008/0016178 | A1 | 1/2008 | Portugali |
| 2008/0016387 | A1 | 1/2008 | Bensinger |
| 2008/0091891 | A1 | 4/2008 | Shiota et al. |
| 2008/0098392 | A1 | 4/2008 | Wipfel et al. |
| 2008/0177974 | A1 | 7/2008 | Chiang et al. |
| 2008/0307180 | A1 | 12/2008 | Hattori et al. |
| 2009/0216970 | A1* | 8/2009 | Basler et al. ............ 711/162 |
| 2010/0005258 | A1* | 1/2010 | Westenberg ............ 711/162 |

FOREIGN PATENT DOCUMENTS

WO   WO 2005/116828   12/2005

OTHER PUBLICATIONS

"SUSE Linux Enterprise Family"; Alfred Bach; undated; Novell; 26 pages.

(Continued)

*Primary Examiner* — Hoai V Ho
*Assistant Examiner* — Tri Hoang
(74) *Attorney, Agent, or Firm* — Schwegman, Lundberg & Woessner, P.A.

(57) ABSTRACT

Methods and apparatus involve computing backup for virtual representations on a physical hardware platform. The platform has a processor, memory and available storage upon which a plurality of virtual machines are configured. Also, each virtual machine has a type of operating system that may be the same or different as another virtual machine. A plurality of virtual machine proxies exists as complements to the virtual machines in order to actually conduct the backup. Upon indication of a present need for conducting a backup operation, the proxy with an operating system most closely approximating or matching the operating system of the virtual machine needing backup is selected for undertaking the operation. In this manner, backup is no longer conducted with ill-fitting physical backup proxies with incompatible operating systems. In other embodiments, nuances of conducting backup are described as are templates and cloning. Computer program products are further described.

29 Claims, 9 Drawing Sheets

OTHER PUBLICATIONS

"SUSE Linux Enterprise Server"; Greg Pryzby, Novell; May 8, 2006; 74 pages.

"Virtualisierung mit Zen"; Sep. 28, 2006; Ralf Dannert, Novell; 72 pages.

"Novell Open Enterprise Server: Novell Branch Office"; 2008; www.novell.com/products/openenterpriseserver/branchoffice.html, 14 pages.

"Pervasive Software-Pervasive Backup Agent Overview"; Jun. 26, 2008; http://ww2.pervasive.com/database/products/Backup/Agent, pages/B, 2 pages.

"Xen—Wikipedia, the Free Encyclopedia"; Jul. 5, 2008; http://en.wikipedia.org/wiki/Xen_%28virtual_machines_monitor%29, 4 pages.

"Hypervisor—Wikipedia, the Free Encyclopedia"; Jul. 8, 2008; http://en.wikipedia.org/wiki/Hypervisor, 6 pages.

"Virtual machine memory access tracing with hypervisor cache"; http://portal.acm.org/citation.cfm?id=1364388; Year of Publication: 2007; 4 Pages.

VMware Consolidated Backup; http://www.vmware.com/products/vi/consolidated_backup.html; Printed on Feb. 23, 2009; 2 Pages.

VMware Consolidated Backup—Centralized backup for virtual machines with zero downtime; Product datasheet; © 1998-2007; 2 Pages.

VMware Consolidated Backup; http://www.vmware.com/products/vi/cb_features.html; Printed on Feb. 23, 2009; 2 Pages.

VMware Infrastructure 3 Data center management and optimization suite—Key Features and Benefits Summary; © 2006; 9 Pages.

VMware Consolidated Backup—Partner Integration Guide; Last Updated Feb. 5, 2009; 6 Pages.

Improve Your Data Protection Capabilities; http://www.vmware.com/solutions/continuity/dataprotection.html; Printed Feb. 23, 2009; 2 Pages.

Building the Virtualized Enterprise with VMware Infrastructure; © 2008; 18 Pages.

Using VMware ESX Server System and VMware Virtual Infrastructure for Backup, Restoration, and Disaster Recovery; © 2005; 18 Pages.

* cited by examiner

DATA BACKUP FOR VIRTUAL MACHINES

FIELD OF THE INVENTION

Generally, the present invention relates to computing devices and environments involving computing backup. Particularly, although not exclusively, it relates to backing up virtual machines by way of other virtual machines acting as proxies. Other features contemplate nuances of conducting backup operations, proxy templates, cloning and computer program products, to name a few.

BACKGROUND OF THE INVENTION

As presently exists, physical computing devices provide a myriad of services. Most have an installed backup agent or other mechanism interacting with a remote backup server to provide restoration services in the event of failure. Performing backup operations in this manner often requires that backup traffic goes over the production network, thereby affecting performance of services that are more directly related to the business.

Furthermore, modern data centers face a sprawl of virtual machines. In such situations, these virtual machines have almost all data to backup and simply having a backup agent to stream traffic to a backup server tends to even more stress the LAN. Also, implementing another LAN only for backup is costly.

Some vendors of virtual machine (VM) technology have implemented an optimization where backups of data are performed by means of a backup proxy: a system whose sole purpose is to connect to the data that needs to be backed up (residing in a VM file, a copy on write snapshot of a file, in a LUN, or in a copy on write snapshot of a LUN) and stream the backup traffic over a dedicated network to a backup server. Existing solutions however rely on physical systems to host the backup proxy, which has limitations.

Using a static physical system limits file level backups to those file systems that are directly supported by the operating system on that physical system. For example, if a Windows 2003 Standard Server is used as a proxy for backup, such as in VMWare's Consolidated Backup (VCB), then a file level backup of data residing in a Ext3 file system is not possible, as a Windows 2003 Standard Server cannot connect to that file system and hence not to the data.

Furthermore there are limits to scalability, as physical systems are expensive and inflexible to work with, should the amount of concurrent backups be increased.

Accordingly, a need exists in the art of computing backup for less costs. The need further contemplates a system that can provide commonality to ease coordination and management activities in a single computing device requiring backup. Even more, the need should extend to virtual environments, each with many domains per a single hardware platform. Naturally, any improvements along such lines should further contemplate good engineering practices, such as ease of implementation, unobtrusiveness, stability, etc.

SUMMARY OF THE INVENTION

The foregoing and other problems become solved by applying the principles and teachings associated with the hereinafter-described data backup for virtual machines. Broadly, methods and apparatus backing up data and other items of virtual machines do so with virtual machine proxies having operating systems matching or most-closely approximating the operating systems of the virtual machines. In this manner, backup is no longer conducted with ill-fitting backup proxies. The embodiments of the invention also take backup traffic to either a dedicated LAN between two physical systems, or even keeps the backup traffic off the LAN by performing SAN to SAN backups. At the same time, embodiments allow for file level backup of any operating system supported by the hypervisor technology used.

In accomplishing the foregoing, a hardware platform has a processor, memory and available storage upon which a plurality of virtual machines are configured. Also, each virtual machine has a type of operating system that may be the same or different as another virtual machine. A plurality of virtual machine proxies exists on a same or different hardware platform and serve as complements to the virtual machines in order to actually conduct the backup. Upon indication of a present need for conducting a backup operation, the proxy with an operating system most closely approximating or matching the operating system of the virtual machine needing backup is selected for undertaking the operation. Selection can occur by way of a policy engine also on the hardware platform or separate from it.

In other embodiments, nuances of conducting backup are described. Particularly, a virtual machine in need of a present backup operation has a relevant drive made inactive or a copy-on-write snapshot is imaged for posterity, in one embodiment. The policy engine determines the operating system type of the virtual machine and chooses a virtual machine as proxy having a same or best-matching operating system. The inactive drive or snapshot is then connected to the proxy and the proxy is booted. A backup agent of the proxy then conducts the backing-up of the virtual machine's inactive drive or snapshot. Thereafter, the policy engine is notified of the success of the operation and the inactive drive is released back to the virtual machine and made active, or the snapshot is deleted.

For the backup agent, two representative types of operations are contemplated. In the first, the backup proxy virtual machine just has the client/agent part of the backup software installed. In this situation, it is sufficient to install a dedicated LAN between the backup server and the physical system that hosts the backup virtual machine proxies (always the same physical system) to keep the backup traffic on that dedicated LAN. In the second, the backup server is installed in the management domain or in another domain on the virtual machine host, next to the backup proxy domain, or even in the same domain. In this way, both the backup proxy virtual machine and the virtual machine that contains the backup server are running on the same physical system. In this situation, the virtual machine that contains the backup server can be given direct access to the SAN on which the final backup target resides. Since the network traffic between the virtual machines never leaves the physical system, this results in a convenient SAN to SAN backup.

In still other embodiments, a template of the virtual machine proxy can be created (or more precisely a template per "kind" of proxy, i.e. a template for the winser2003 proxy virtual machine, a template for the SLES proxy virtual machine, etc.). Thereafter, a clone can be made whenever a backup operation needs to be undertaken. That way, multiple backups can be automatically run in parallel, especially by creating a set of clones that would each attach to a client VM whose data needs to be backed up. The system administrator could configure such and set the amount of clone operations that could be undertaken. Upon finishing one backup, the clone could reboot and attach to another client VM, until all disks belonging to client VM's that are to be backed up are indeed backed up.

Executable instructions loaded on one or more computing devices for undertaking the foregoing are also contemplated as are computer program products available as a download or on a computer readable medium. The computer program products are also available for installation on a network appliance or individual computing devices.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for computing backup of virtual machines.

Figure 1:
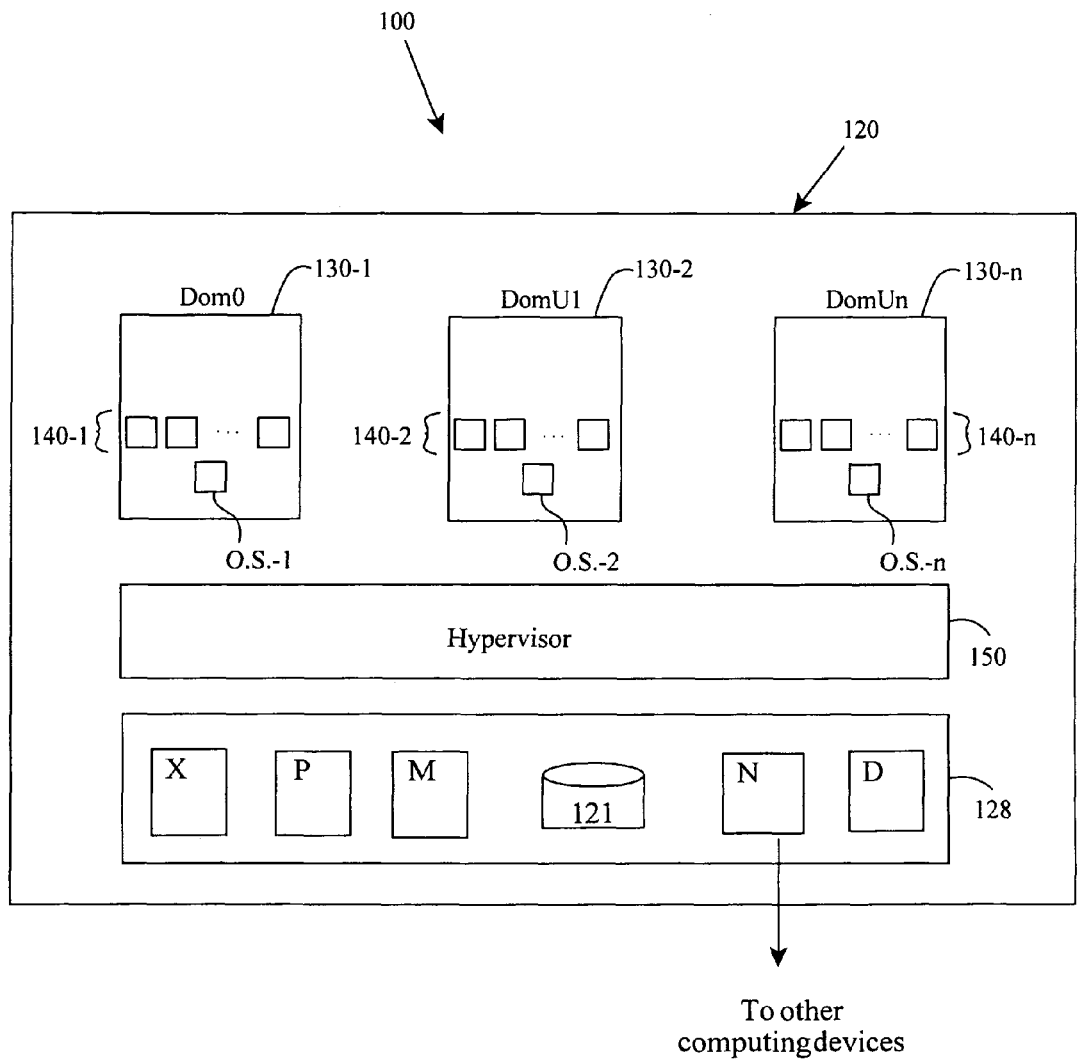
FIG. 1 is a diagrammatic view in accordance with the present invention of a basic virtual computing environment for backup.

With reference to FIG. 1, a computing system environment 100 includes a computing device 120. Representatively, the device is a laptop computer, general or special purpose computer, a phone, a PDA, a server, etc., having a hardware platform 128. As is typical, the hardware platform embodies physical I/O and platform devices, memory (M), access to remote or local storage drives 121, processor (P), such as a CPU(s), USB or other interfaces (X), drivers (D), etc. In turn, the hardware platform hosts one or more virtual machines in the form of domains 130-1 (domain 0, or management domain), 130-2 (domain U1), . . . 130-n (domain Un), each having its own guest operating system (O.S.) (e.g., Linux, Windows, Netware, Unix, etc.), applications 140-1, 140-2, . . . 140-n, file systems, etc.

An intervening Xen or other hypervisor layer 150, also known as a "virtual machine monitor," or virtualization manager, is the virtual interface to the hardware and virtualizes the hardware. It is also the lowest and most privileged layer and performs scheduling control between the virtual machines as they task the resources of the hardware platform, e.g., memory, processor, storage, network (N) (by way of network interface cards, for example), etc. The hypervisor also manages conflicts, among other things, caused by operating system access to privileged machine instructions. The hypervisor can also be type 1 (native) or type 2 (hosted). According to various partitions, the operating systems, applications, application data, boot data, or other data, executable instructions, etc., of the machines are virtually stored on the resources of the hardware platform, and such is typical in a virtual environment.

Figure 2:
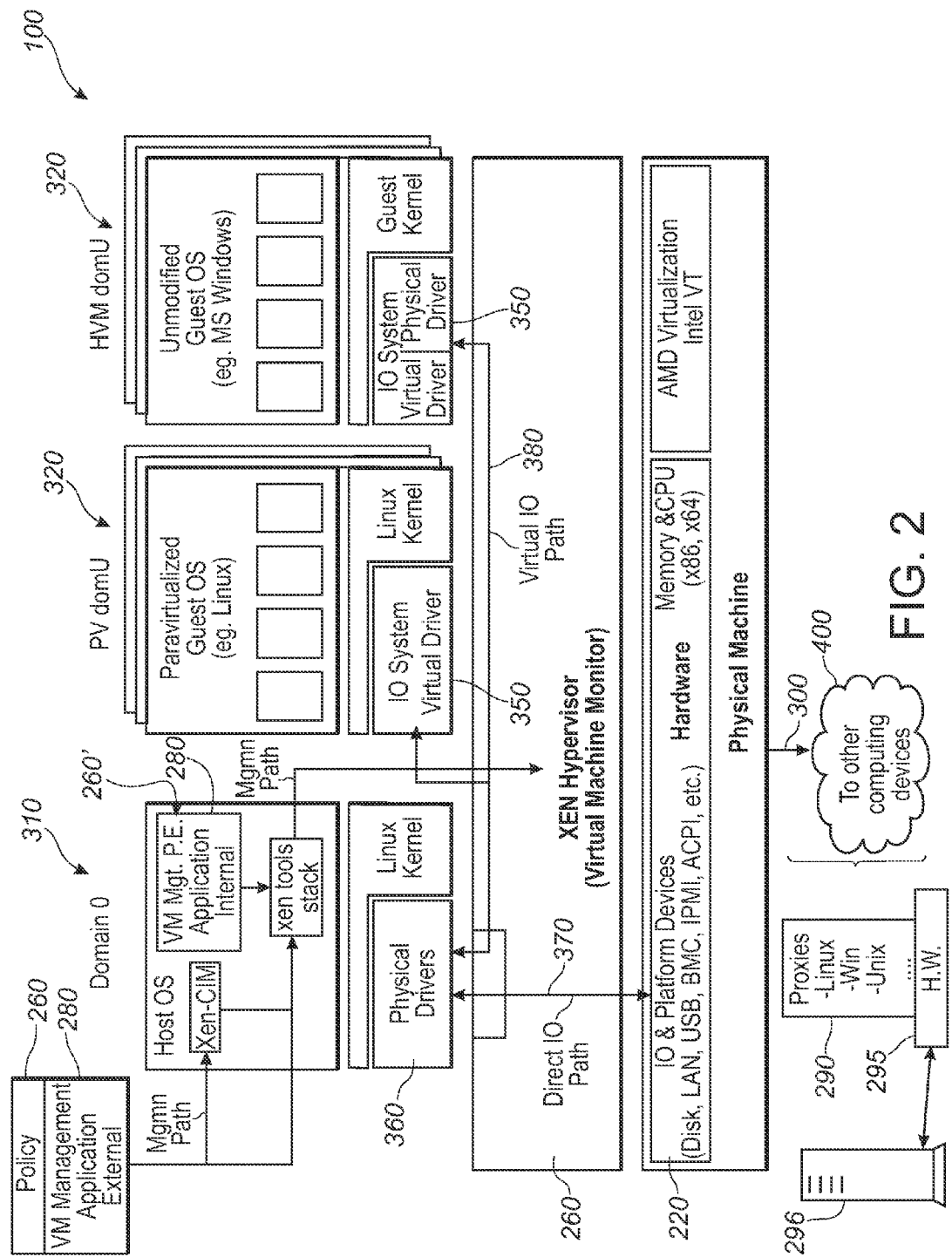
FIG. 2 is a more detailed diagrammatic view in accordance with the present invention for the features of FIG. 1.

In more detail, FIG. 2, a representative computing system environment 100 may further include a computing device in the form of a server. It can be of a traditional type, such as a grid or blade server, and can fulfill any future-defined or traditional role, such as a web server, email server, database server, file server, etc. In network, it is arranged to communicate 300 with one or more other computing devices or networks. For example, the server may use wired, wireless or combined connections to other devices/networks and may be direct or indirect connections. If direct, they typify connections within physical or network proximity (e.g., intranet). If indirect, they typify connections such as those found with the internet, satellites, radio transmissions, or the like, and are given nebulously as element 400. In this regard, other contemplated items include other servers, routers, peer devices, modems, Tx lines, satellites, microwave relays or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

In configuration, the physical server can be arranged in a variety of ways, including virtual representations such as according to the Xen architecture for Novell, Inc., (the assignee of the invention). Namely, the architecture can include a multiplicity of domains (dom0, 310 or domU, 320) and a variety of operating systems (Host OS or Guest OS) (e.g., Linux, Windows, Netware, Unix, etc.). In turn, dom0 is the management domain for Xen guests and dynamically undertakes control of computing resources, such as memory, CPU, etc., provides interface to the physical server, and provides various administration tools. Domains domU, 320 are those that host the application workloads per each virtual machine, including virtual device drivers 350 which connect to the physical drivers 360 in dom0 by the hypervisor 260 or physical device drivers in a direct fashion, and can be stored as a file image on remote or local storage devices (121, FIG. 1). In this regard, an I/O path exists as one or both of a direct I/O path 370 between the physical drivers and the hardware platform 220 or a common I/O path 380 between all of the virtual drivers 350, of domains domU, and the physical drivers 360 of domain dom0.

Also, a policy engine 260 and/or 260' can reside on a same or different hardware platform, along with a management application 280 and/or 280', or both, that is used in undertaking backup operations, as will be seen. Similarly, a plurality of virtual machine proxies 290 on a same or different hardware platform (in this instance a separate hardware platform 295) is provided for actually undertaking backup of the virtual machines 320 relative to a device such as a backup server 296.

Figure 3:
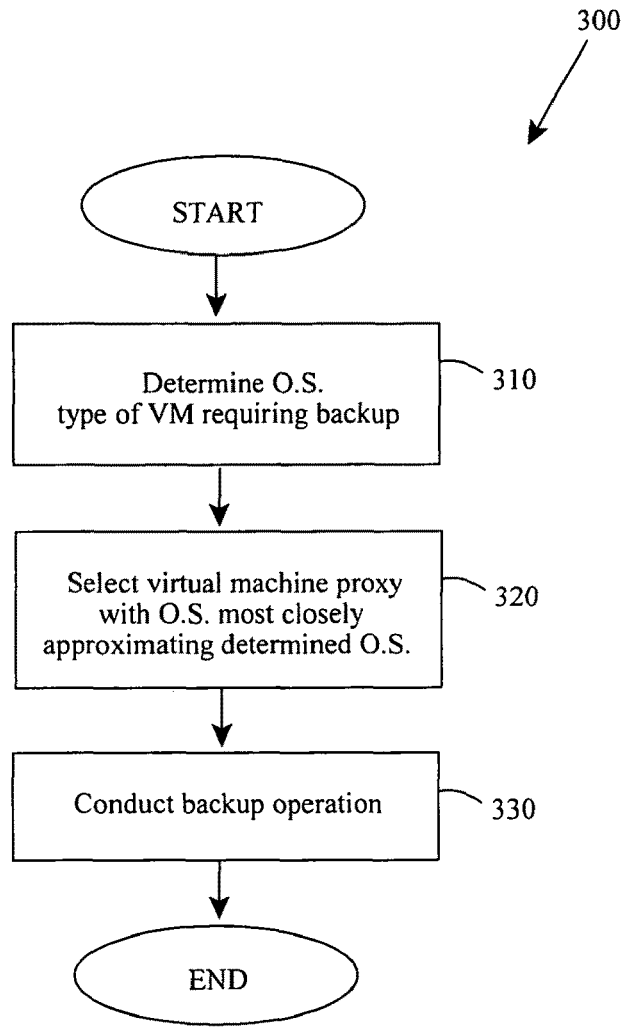
FIG. 3 is a representative flow chart in accordance with the present invention for conducting backup.

Leveraging the foregoing, FIG. 3 shows a high-level operation 300 for backup of a virtual machine. At step 310, it is first determined what type of operating system (OS) is being used by a virtual machine in present need of a backup operation. Upon such determining, step 320, a proxy (290, FIG. 2) of a plurality of virtual machine proxies is selected having an operating system most closely approximating (or matching) the operating system of the virtual machine needing backup. Then, at step 330, backup operations for the virtual machine are undertaken. In this way, no longer is backup conducted with ill-fitting proxies.

With reference to FIGS. 4A-4F, it will now be seen how the policy engine and proxies actually interface to undertake backing up virtual machines according to the flow of FIG. 3. In the example that follows, two virtual machines VM1 and VM2 have available storage 121 in the form of an OS (C:) drive and a data (D:) drive. Further, the backup of interest occurs relative to that which is stored on the data drive relative to VM2. On the other hand, the OS drive is a stateless image. Also, the data drive can be a file, a LUN on a SAN, etc. and, for the sake of simplicity, it is assumed that the data drive's backing store is a file. Further, the example contemplates that all drives, e.g., the OS and data drives, of all virtual machines are stored in a shared LUN. As will be seen, the physical machine 295 that is acting as the host of the virtual machine proxies will eventually have to be connected to that shared storage. Lastly, each of the virtual machines are "active" as they undertake the computing activities associated with their respectively workloads, while the virtual machine proxies 290 are down or inactive until such time as one of the virtual machines VM1 or VM2 require a backup operation, which is the environment of FIG. 4A.

Figure 4A:
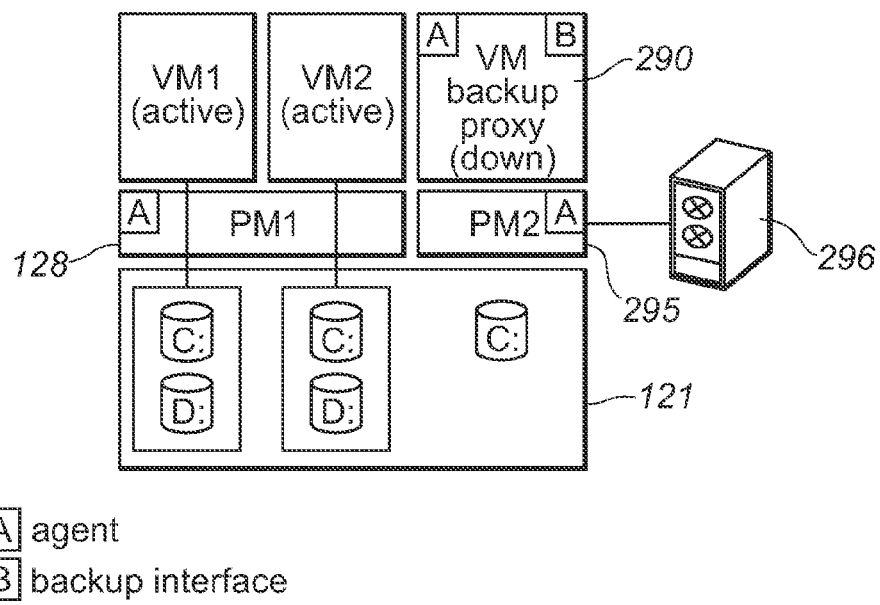
FIGS. 4A-4F are sequential diagrammatic views in accordance with the present invention for a particular case study showing a more detailed example of computing backup.
Figure 4B:
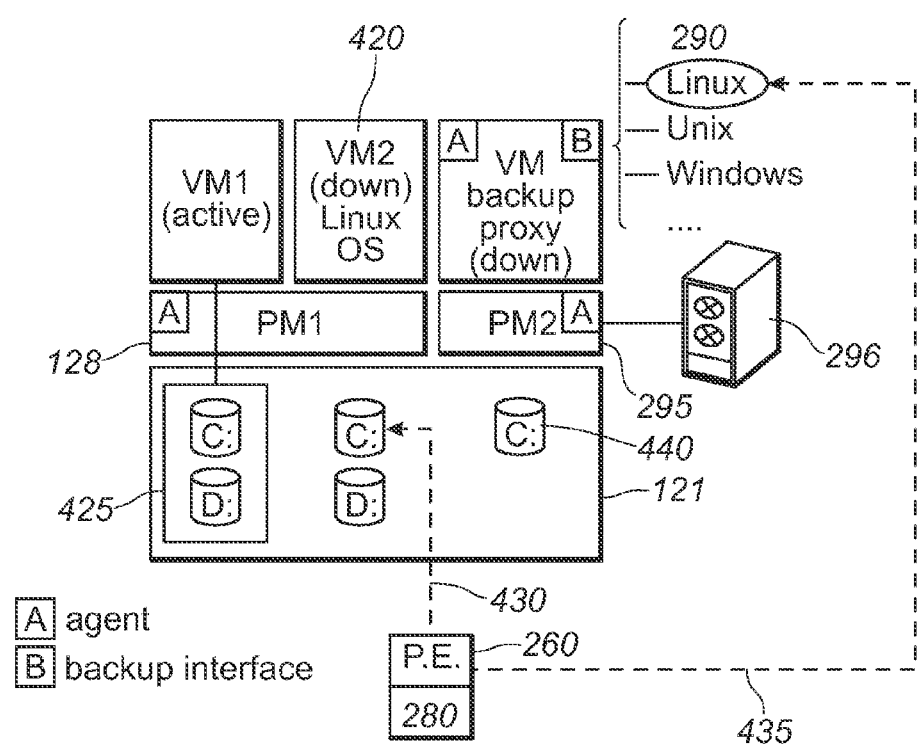

Upon such time as VM2 requiring or indicating that a backup operation is due, FIG. 4B, VM2 is brought down 420 thereby making inactive its attendant data drive (evidenced by the lack of operational lines 425 around drives the OS and data drives as with VM1). At such time, a snapshot is captured (e.g., a copy-on-write snapshot) for the contents of the data drive. By way of the Policy Engine PE, 260, it is then determined what type of operating system is running in the OS drive of VM2, step 430. The Policy Engine then chooses a virtual machine proxy 290 that contains the same or best-matching operating system to that of the virtual machine, step 435. In this situation, the Linux virtual machine proxy is selected to best match the operating system of the Linux virtual machine operating as in PV domU in FIG. 2. Of course, other examples are possible. Also, as different versions of operating systems evolve over time, an operating system of a virtual machine in need of backup may have one version, such as a Windows XP operating system, but the virtual machine proxy has a different version, such as a Windows Vista operating system, but selection of Vista to XP is a better match than selecting a Unix- or Linux-based virtual machine proxy, for example. Further, once the operating systems are known, it may not be necessary to actually determine an operating system type upon subsequent backups.

Figure 4C:
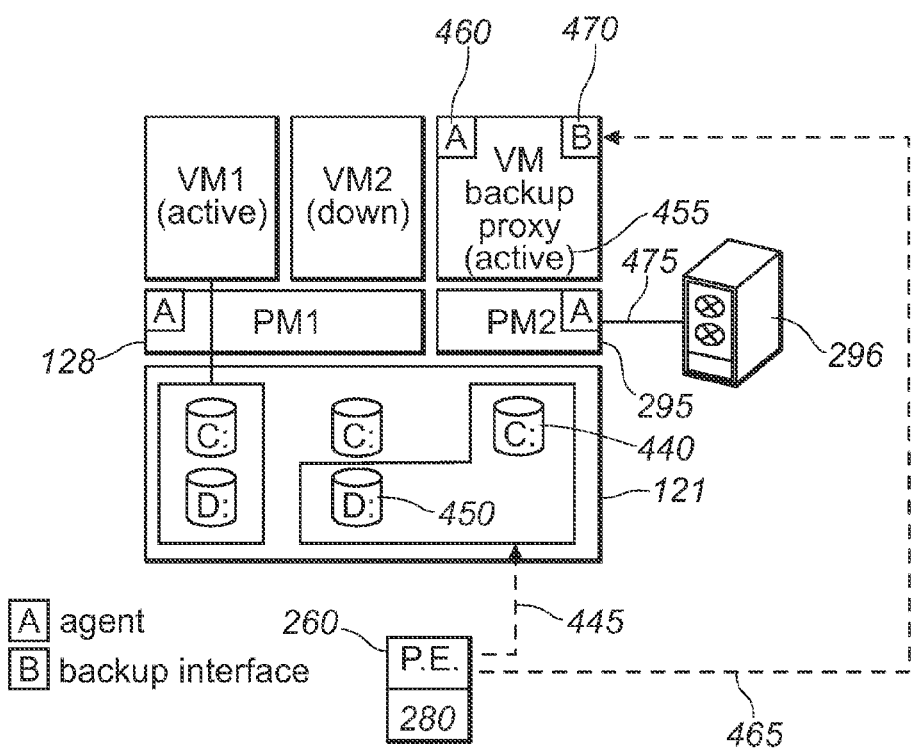
Figure 4D:
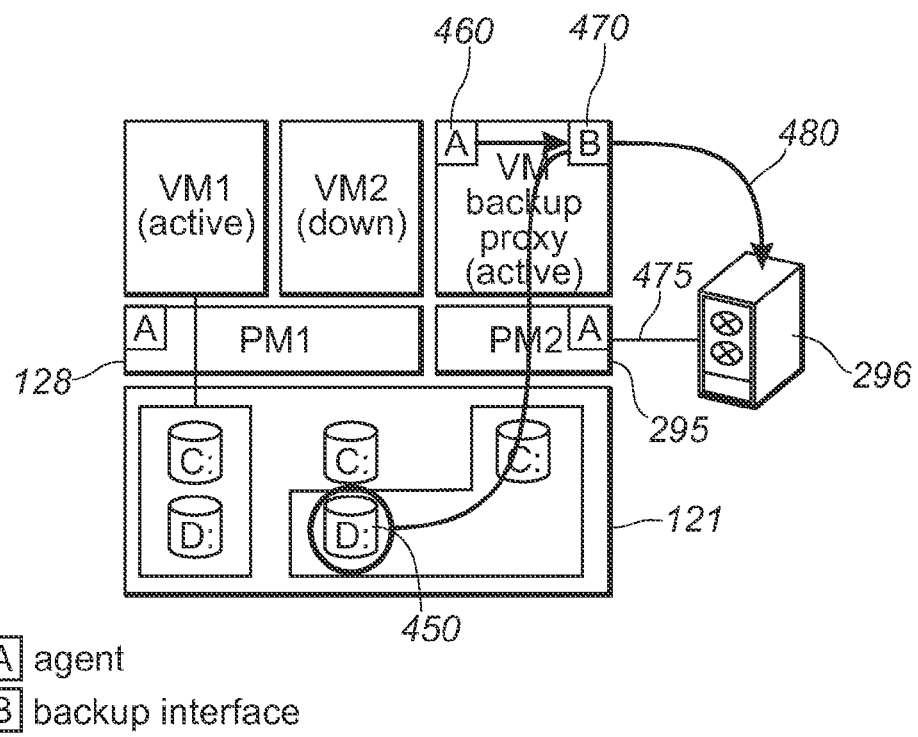

With reference to FIGS. 4B and 4C, it is seen that the virtual machine proxy only has an OS drive 440, but the Policy Engine now adds 445 the passive data drive 450 of VM2 (or a snapshot of the active drive in an alternate embodiment) to the configuration of the chosen virtual machine proxy (e.g., Linux proxy) and boots the proxy 455. Upon booting, the virtual machine proxy has an agent 460 installed in it which allows the Policy Engine to instruct 465 the backup interface 470, also installed in the virtual machine proxy, to backup 480 the data drive 450 (or snapshot of the active drive in the alternate embodiment) that is now connected to the backup virtual machine proxy, FIG. 4D. As before, there are two, non-limiting, representative examples.

In the first, the backup proxy virtual machine just has the client/agent part of the backup software installed. In this situation, it is enough to install a dedicated LAN 475 between the backup server 296 and the physical machine PM2 that hosts the backup virtual machine proxy (always the same physical system) to keep the backup traffic on that dedicated LAN. In the second, the backup server is installed in the management domain, e.g., dom0, FIG. 2, or in another domain (dom U, FIG. 2) on the virtual machine host 128, next to the backup proxy domain. In this way, both the backup proxy virtual machine and the virtual machine that contains the backup server are running on the same physical system. In this situation, the virtual machine that contains the backup server can be given direct access to the SAN on which the final backup target resides. Since the network traffic between the virtual machines never leaves the physical system, this results in a convenient SAN to SAN backup.

Figure 4E:
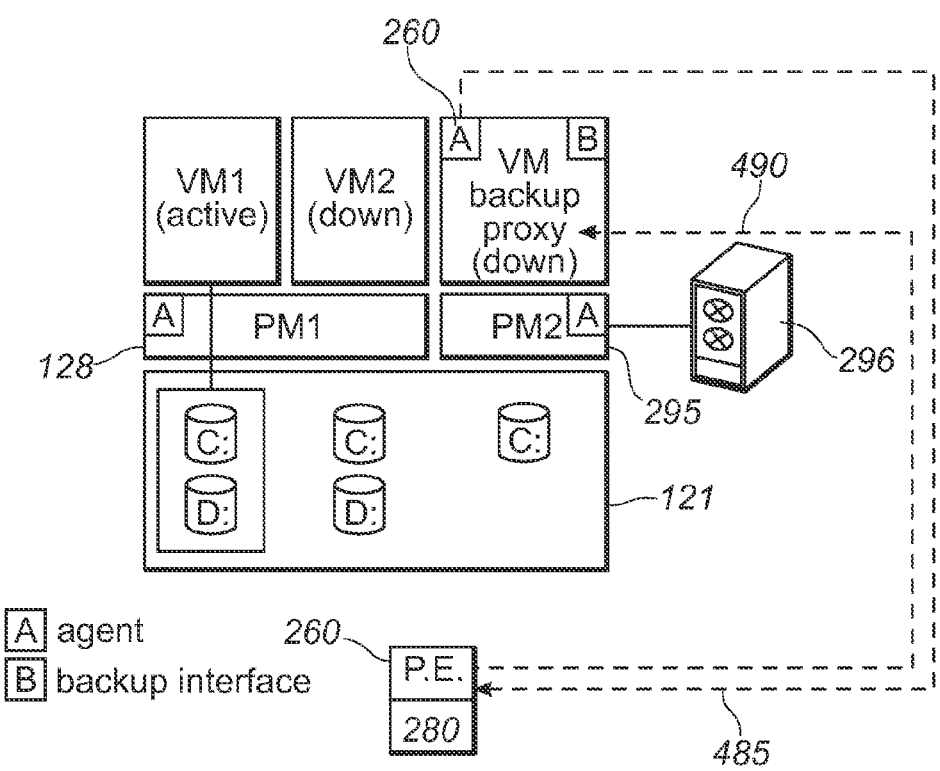
Figure 4F:
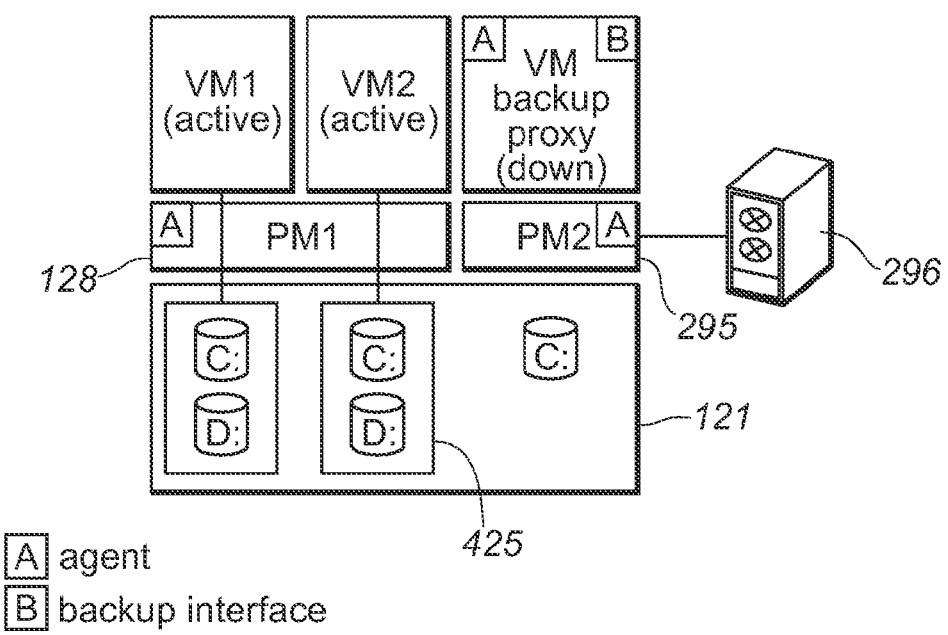

With reference to FIG. 4E, once the backup operation is complete, the Policy Engine 260 is notified 485 of the success of the operation via the agent 260 installed in the backup virtual machine proxy. The Policy Engine then takes down 490 the virtual machine proxy so that all disks connected to it become inactive. If a snapshot of the data drive of VM2 was indeed earlier taken, it can now be removed (automatically via the Policy Engine, as one example). With reference to FIG. 4F, all drives earlier made inactive for VM2 are now restored 425 back to the control of VM2 and normal workload operations continue until such time as it or another VM requires another backup operation.

In any embodiment, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks for insertion in a drive of computing device, or available as downloads or direct use from an upstream computing device. When described in the context of such computer program products, it is denoted that components thereof, such as modules, routines, programs, objects, data structures, etc., perform particular tasks or implement particular abstract data types within various structures of the computing system which cause a certain function or group of function, and such are well known in the art.

Although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment, a method of providing computing backup to a plurality of virtual machines configured on a hardware platform, each said virtual machine having an operating system, comprising:

upon indication of undertaking a backup operation for one of the virtual machines, determining a type of said operating system for said one virtual machine;

selecting a virtual machine proxy having an operating system most closely approximating said type of said operating system for said one virtual machine; and enabling said backup operation through use of the selected virtual machine proxy.

2. The method of claim 1, wherein the enabling said backup operation further includes making inactive a drive of said one virtual machine.

3. The method of claim 1, further including capturing a snapshot of the contents of a still inactive drive.

4. The method of claim 2 or 3, further including determining said type of said operating system for said one virtual machine by examining an operating system type of a drive of said one virtual machine.

5. The method of claim 2, further including conducting said backup operation and making active said made inactive drive.

6. The method of claim 1, wherein the selecting the virtual machine proxy further includes selecting the proxy having a same operating system as said type of said operating system for said one virtual machine.

7. The method of claim 1, further including making a template for each said virtual machine proxy.

8. The method of claim 7, further including creating a clone from the template upon said indication of the undertaking the backup operation for the one of the virtual machines.

9. In a computing system environment, a method of providing computing backup to a plurality of virtual machines configured on a hardware platform, each said virtual machine having a type of operating system, comprising:
  selecting from a plurality of proxies a virtual machine proxy having an operating system most closely approximating said type of said operating system for one of the virtual machines requiring a backup operation; and
  conducting the backup operation through use of the selected virtual machine proxy.

10. The method of claim 9, further including configuring the plurality of proxies in a single virtual machine of the plurality of virtual machines configured on the hardware platform.

11. The method of claim 9, further including configuring to a common storage device the selected virtual machine proxy and the one of the virtual machines requiring the backup operation.

12. In a computing system environment, a method of providing computing backup, comprising:
  configuring a plurality of virtual machines on a common hardware platform, each said virtual machine having an operating system;
  by one of the virtual machines, indicating a backup operation;
  determining a type of said operating system for said one virtual machine; and
  enabling the backup operation with a virtual machine proxy having an operating system most closely approximating said determined type.

13. In a computing system environment, a method of providing computing backup, comprising:
  configuring a plurality of virtual machines on a common hardware platform, each said virtual machine having an operating system;
  by one of the virtual machines, indicating a backup operation;
  determining a type of said operating system for said one virtual machine; and
  from a plurality of virtual machine templates, cloning a virtual machine proxy having an operating system most closely approximating said determined type of said operating system for said one virtual machine.

14. The method of claim 13, further including enabling said backup operation through use of the cloned virtual machine proxy.

15. In a computing system environment, a method of providing computing backup to a plurality of virtual machines configured on a hardware platform, each said virtual machine having a type of operating system, comprising:
  determining said type of operating system for one of the virtual machines requiring a backup operation; and
  conducting the backup operation with a virtual machine proxy having an operating system most closely approximating said determined type.

16. The method of claim 15, wherein the conducting the backup operation further includes selecting from a plurality of virtual machine proxies one virtual machine proxy having a same operating system as the determined said type of operating system for the one of the virtual machines requiring the backup operation.

17. In a computing system environment, a method of providing computing backup, comprising:
  providing a hardware platform having a processor, memory and available storage upon which a plurality of virtual machines can be configured and operated by way of scheduling control from a hypervisor layer also on the hardware platform;
  configuring a plurality of virtual machine proxies;
  configuring to the available storage the plurality of virtual machines and at least one of the plurality of virtual machine proxies;
  upon indicating a backup operation by one of the plurality of virtual machines, determining a type of said operating system for said one virtual machine; and
  enabling the backup operation to occur with the at least one virtual machine proxy which has an operating system most closely approximating said determined type.

18. A computing device, comprising:
  a hardware platform having at least a processor, memory and available storage;
  a plurality of virtual machines each operating as an independent guest computing device on the processor, memory and storage by way of scheduling control from a hypervisor layer also configured on the hardware platform, each of the plurality of virtual machines having an operating system; and
  a plurality of virtual machine proxies for conducting backup operations for the plurality of virtual machines, each of the virtual machine proxies having an operating system such that upon one of the virtual machines having a present need for said conducting backup operations one selected virtual machine proxy of the plurality of virtual machine proxies will have its said operating system matching said operating system of the one virtual machine.

19. The computing device of claim 18, further including a policy engine on a separate or same hardware platform as the plurality of virtual machines for determining a type of the operating system of said one virtual machine having said present need for said conducting backup operations.

20. The computing device of claim 18, wherein the plurality of virtual machine proxies reside on a hardware platform different than said hardware platform hosting the plurality of virtual machines.

21. A computer program product for loading on a computing device to provide computing backup, the computer program product having executable instructions that enables determining a type of operating system for each of a plurality of virtual machines operating as an independent guest computing device on a processor, memory and storage of a hardware platform by way of scheduling control from a hypervisor layer also configured on the hardware platform and upon one of the virtual machines having a present need for conducting a backup operation determining which proxy of a plurality of virtual machine proxies have an operating system best matching said operating system of the one virtual machine.

22. The computer program product of claim 21, further including executable instructions for conducting said backup operation with the which proxy of the plurality of virtual machine proxies.

23. The computer program product of claim 21, further including executable instructions for cloning a virtual machine proxy from a template, the cloned virtual machine proxy having a same operating system as said operating system of the one virtual machine.

24. The computer program product of claim 21, further including executable instructions for installing the computer program product on said hardware platform.

25. The computer program product of claim 21, further including executable instructions for actually conducting the backup operation.

26. The computer program product of claim 25, further including executable instructions for making inactive an associated drive of said one of the virtual machines having said present need for said conducting the backup operation or for taking a snapshot of said drive if said drive is required to stay active.

27. The computer program product of claim 26, further including executable instructions for booting said which proxy of the plurality of virtual machine proxies.

28. The computer program product of claim 27, further including executable instructions for configuring said which proxy of the plurality of virtual machine proxies to the associated drive of said one of the virtual machines having said present need for said conducting the backup operation.

29. The computer program product of claim 28, further including executable instructions for releasing control of the associated drive back to said one of the virtual machines after said conducting the backup operation or for deleting said snapshot.

* * * * *